(12) United States Patent
Polk et al.

(10) Patent No.: US 9,008,122 B2
(45) Date of Patent: Apr. 14, 2015

(54) METHOD AND APPARATUS FOR TRIGGERING BANDWIDTH UPSPEEDING WITHIN AN EXISTING RESERVATION

(75) Inventors: James M. Polk, Colleyville, TX (US); Paul E. Jones, Apex, NC (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 13/555,508

(22) Filed: Jul. 23, 2012

(65) Prior Publication Data

US 2014/0023088 A1    Jan. 23, 2014

(51) Int. Cl.
*H04L 29/02* (2006.01)
*H04L 12/917* (2013.01)
*H04L 12/913* (2013.01)
*H04L 12/911* (2013.01)

(52) U.S. Cl.
CPC .............. *H04L 47/76* (2013.01); *H04L 47/748* (2013.01); *H04L 47/724* (2013.01)

(58) Field of Classification Search
CPC ..... H04L 12/5695; H04L 47/10; H04L 47/15; H04L 29/06; H04J 3/1682; H04Q 11/0478; H04W 28/06; G10L 19/02
USPC .................................................. 370/468, 477
See application file for complete search history.

(56) References Cited

U.S. PATENT DOCUMENTS

| | | | | |
|---|---|---|---|---|
| 6,876,668 B1 * | 4/2005 | Chawla et al. | ................ | 370/468 |
| 7,035,211 B1 * | 4/2006 | Smith et al. | ................... | 370/230 |
| 7,286,471 B2 * | 10/2007 | Kloth et al. | ................... | 370/230 |
| 8,184,530 B1 * | 5/2012 | Swan et al. | ................... | 370/230 |
| 8,243,663 B2 * | 8/2012 | Spinar et al. | .................. | 370/329 |
| 8,249,014 B2 * | 8/2012 | Stanwood et al. | ............. | 370/329 |
| 8,612,330 B1 * | 12/2013 | Certain et al. | .................. | 705/37 |
| 2011/0261835 A1 * | 10/2011 | Dhesikan et al. | ............. | 370/468 |
| 2012/0026873 A1 * | 2/2012 | Spinar et al. | .................. | 370/230 |
| 2013/0109422 A1 * | 5/2013 | Xie et al. | ....................... | 455/509 |
| 2013/0215745 A1 * | 8/2013 | Shubhakoti et al. | .......... | 370/235 |
| 2013/0297673 A1 * | 11/2013 | McGrath et al. | ............. | 709/203 |

OTHER PUBLICATIONS

IEEE 802.11e EDCA QoS Provisioning with Dynamic Fuzzy Control and Cross-Layer Interface, Chen, Chao-Lieh, 1-4244-1251-X/07/$25.00 © 2007 IEEE.*
Resource ReSerVation Protocol (RSVP)—Version 1 Functional Specification, Braden, R., Zhang, L., Berson, S., Herzog, S., Jamin, S., IETF RFC 2205, Sep. 1997.*

* cited by examiner

*Primary Examiner* — Melvin Marcelo
*Assistant Examiner* — Peter Solinsky
(74) *Attorney, Agent, or Firm* — P. Su

(57) ABSTRACT

In one embodiment, a method includes reserving a first amount of bandwidth with respect to a path in response to a reservation request from a sender. The reservation request specifies a plurality of acceptable amounts of bandwidth including the first amount of bandwidth and a second amount of bandwidth. The first amount of bandwidth is less than the second amount of bandwidth. The method also includes determining, after reserving the first amount of bandwidth, that additional bandwidth sufficient to accommodate the second amount of bandwidth is available, and automatically providing a first indication that the additional bandwidth is available. Automatically providing the first indication that the additional bandwidth is available includes providing the first indication to at least the sender. Finally, the method includes obtaining a second indication, the second indication being arranged to indicate whether the second amount of bandwidth may be accommodated with respect to the path.

24 Claims, 6 Drawing Sheets

METHOD AND APPARATUS FOR TRIGGERING BANDWIDTH UPSPEEDING WITHIN AN EXISTING RESERVATION

TECHNICAL FIELD

The disclosure relates generally to communications systems. More particularly, the disclosure relates to automatically triggering a process to update an existing reservation to include additional bandwidth when the additional bandwidth becomes available.

BACKGROUND

The Resource Reservation Protocol (RSVP) is a transport layer protocol which allows resources to be reserved across a network. The resources are generally reserved for a flow. Typically, a sender of a request will send an RSVP reservation initiation, or PATH, message downstream to a receiver. The receiver will send an RSVP reservation response (RESV) message upstream towards the PATH originator of the request in response to the PATH message. Some hops in a path between the receiver and the sender is arranged to create and maintain a reservation state that is associated with the resources reserved for data packets which are to be sent from the sender.

In some systems, an integrated services MULTI-TSPEC object may communicate more than one traffic specification (TSPEC) request in the same RSVP setup message exchange. When more than one TSPEC request is communicated, each containing a separate bandwidth request, a recipient of the TSPEC request, e.g., a router along a path, may allocate an acceptable amount of bandwidth that is available with respect to the recipient, even if the recipient is unable to allocate a preferred, e.g., maximum desired, amount of bandwidth. That is, an acceptable amount of bandwidth that is less than a preferred amount of bandwidth may be reserved for a source or a sender when the source or the sender communicates more than one TSPEC request in the same RSVP setup message exchange. This results in an acceptable, but not optimal or preferred, reservation bandwidth between the source and a receiver.

A recipient that has established a reservation for less than a preferred amount of bandwidth for a source may determine, at some point after the reservation has been established, that the recipient may allocate more bandwidth to the source. In order for the source to take advantage of the additional bandwidth that is available, additional reservation exchanges, which typically involve trial and error, occur. Thus, obtaining additional bandwidth for use with respect to an existing reservation is generally inefficient.

BRIEF DESCRIPTION OF THE DRAWINGS

The disclosure will be readily understood by the following detailed description in conjunction with the accompanying drawings in which.

DESCRIPTION OF EXAMPLE EMBODIMENTS

General Overview

Figure 1A:
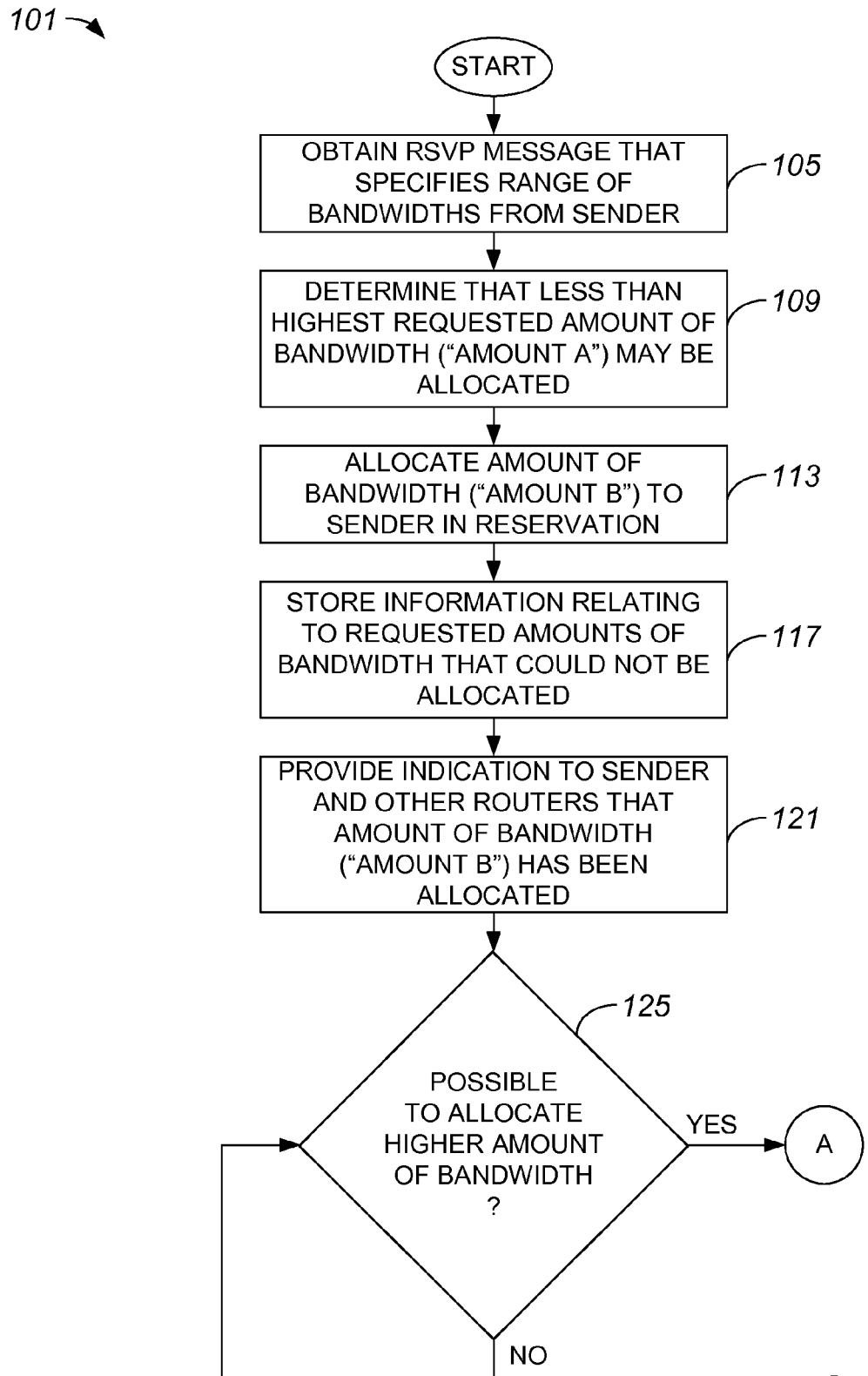
FIGS. 1A and 1B are a process flow diagram which illustrates an overall upspeeding process from the point of view of a network element, e.g., router, in accordance with an embodiment.

According to one aspect, a method includes reserving a first amount of bandwidth with respect to a path in response to a reservation request from a sender. The reservation request specifies a plurality of acceptable amounts of bandwidth including the first amount of bandwidth and a second amount of bandwidth. The first amount of bandwidth is less than the second amount of bandwidth. The method also includes determining, after reserving the first amount of bandwidth, that additional bandwidth sufficient to accommodate the second amount of bandwidth is available, and automatically providing a first indication that the additional bandwidth is available. Automatically providing the first indication that the additional bandwidth is available includes providing the first indication to at least the sender. Finally, the method includes obtaining a second indication, the second indication being arranged to indicate whether the second amount of bandwidth may be accommodated with respect to the path.

Description

By including multiple bandwidth requests within the same reservation request in a single Resource Reservation Protocol (RSVP) message, a bandwidth allocation may be reserved relatively efficiently. If a reservation (RESV) request message carries more than one bandwidth request, if a relatively high bandwidth request contained in the RESV request message may not be accommodated, it may be possible to accommodate a lower bandwidth request contained in the RESV request message. Hence, a lower than desired bandwidth may be allocated for a particular flow in response to a single RESV request message, i.e., the same RESV request message used to request a desired bandwidth.

Allowing RESV request messages to carry multiple traffic specification (TSPEC) objects enables a single RESV request message to effectively provide multiple acceptable bandwidths allocations for a desired flow. For example, a single RESV request message may specify first, second, and third bandwidth requests such that if a first bandwidth request may not be accommodated, the second bandwidth is considered and, if necessary, the third bandwidth is considered. It should be appreciated that more than three bandwidth requests may be specified.

When a source or a sender reserves bandwidth along a path, the source or sender may communicate more than one acceptable bandwidth. For example, if a source desires a preferred amount of bandwidth but may utilize a lesser amount of bandwidth, the source may communicate both the preferred amount of bandwidth and the lesser amount of bandwidth along the path. Thus, if the preferred amount of bandwidth is not available, the lesser amount of bandwidth may be allocated. Amounts of bandwidth may be specified in different TSPEC requests within a MULTI-TSPEC object, and may be communicated during a RSVP setup message exchange, e.g., contained in a PATH message and/or a RESV message. MULTI-TSPEC objects are described in U.S. Pat. No. 8,000,347, which is incorporated herein by reference in its entirety.

When less than a preferred amount of bandwidth is reserved because a router, at the time of a reservation, was unable to provide the preferred amount of bandwidth, the router may determine at a later time that the router has become capable of allocating additional bandwidth, e.g., a preferred amount of bandwidth. In one embodiment, the router may substantially automatically trigger an upspeeding of the reservation when the router determines that the router has the ability to allocate more bandwidth. By automatically triggering an upspeeding, or an increase in the amount of bandwidth allocated to the reservation, an additional amount of bandwidth may be substantially added to the existing reservation in an efficient manner.

When an intermediate router, e.g., a router along a path between a source or sender and a destination or recipient, intercepts or otherwise obtains a reservation request that specifies more than one TSPEC, the intermediate router determines how much bandwidth may be reserved for the requested reservation. When the higher bandwidth requested, as specified in a TSPEC, may not be accommodated, the intermediate router may accept a reservation for a lower amount of bandwidth, and retain a state for each TSPEC associated with a higher bandwidth tan the accommodated bandwidth. For example, if a RESV request specifies acceptable bandwidths of one megabit per second (mbps), five mbps, and twelve mbps, and an intermediate router may accommodate substantially only one mbps in a reservation, then the intermediate router may retain states that indicate that bandwidths of five mbps and twelve mbps were requested but not accommodated in the reservation. When the intermediate router determines, after a reservation has been established, that a higher specified acceptable bandwidth may be accommodated, the intermediate router may inform at least the source that the higher specified acceptable bandwidth may be accommodated. Thus, the source is informed that a previously rejected higher acceptable bandwidth may now be accommodated in an existing reservation. If the higher acceptable bandwidth may be accommodated throughout a path, then the existing reservation may be updated to reserve the higher acceptable bandwidth. That is, upspeeding may occur to increase the bandwidth associated with the existing reservation.

An application within a requesting node or endpoint, e.g., a source or a sender, may effectively ask for a desired bandwidth allocation and at least one backup bandwidth allocation, e.g., a bandwidth allocation that would be acceptable in the absence of the desired bandwidth allocation. The desired or preferred bandwidth allocation and at least one backup bandwidth allocation may be provided in TSPEC objects contained in an RSVP request message such as an RSVP RESV request message. If the accumulation of routers that the RESV request message passes through, i.e., a network, is able to accommodate the desired bandwidth allocation, the desired bandwidth may be reserved. Otherwise, if the desired bandwidth may not be reserved but a backup bandwidth allocation may be accommodated, the backup bandwidth allocation may be reserved, and a router that was unable to accommodate the desired bandwidth allocation may store information which indicates that the desired bandwidth allocation was not reserved.

Figure 1B:
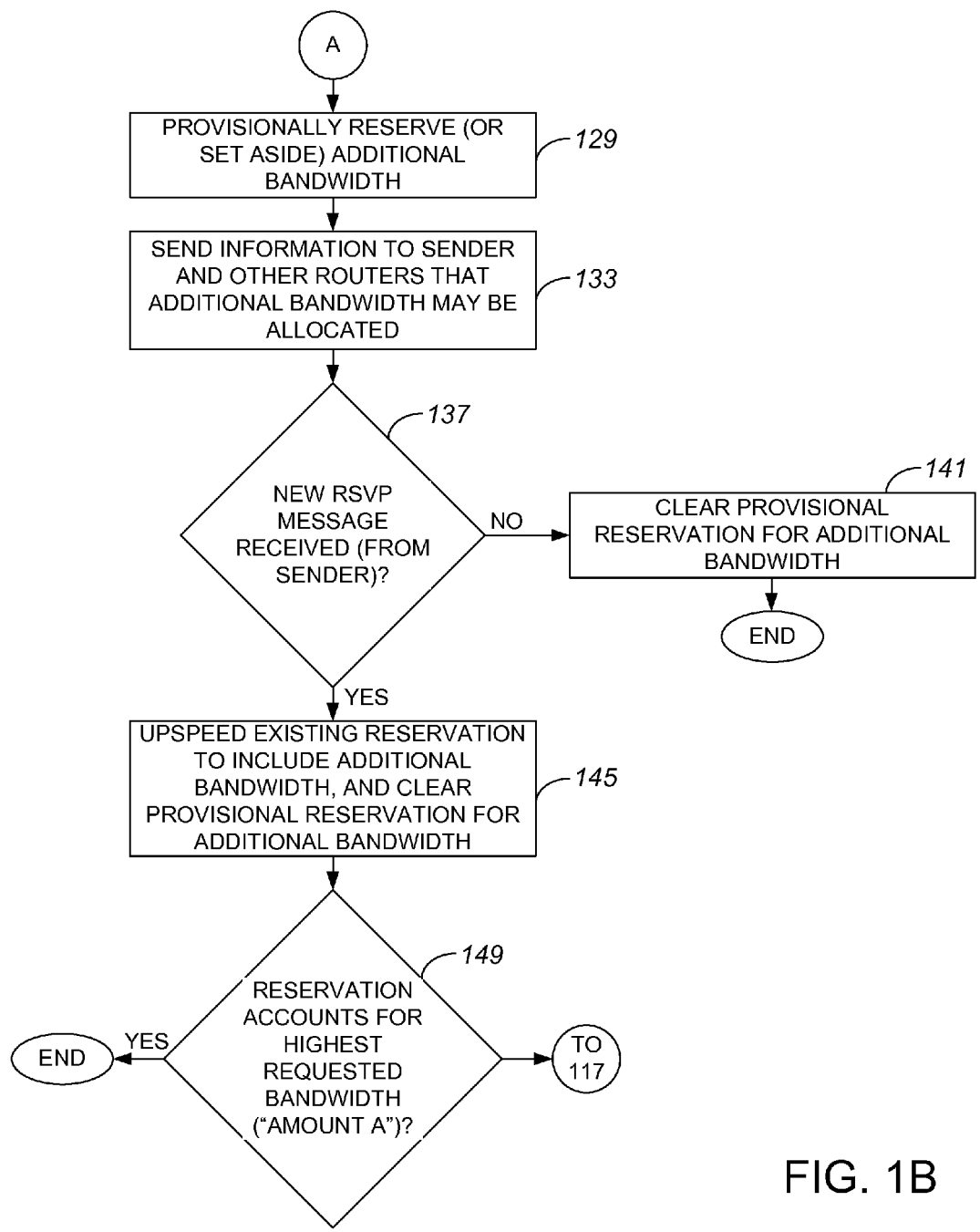

Referring initially to FIGS. 1A and 1B, a process of establishing a reservation and subsequently upspeeding the reservation will be described from the point of view of a network element, e.g., a router, along a path for which the reservation is established in accordance with an embodiment. A process 105 of establishing a reservation and subsequently upspeeding the reservation begins at step 105 in which a network element, e.g., a router, obtains an RSVP message that specifies a range of bandwidths. In one embodiment, the range of bandwidths may be specified in an RESV request message received from a sender. While any number of bandwidths may be specified in the RSVP message, it should be appreciated that the bandwidths typically includes at least a preferred bandwidth, e.g., a highest requested amount of bandwidth, and at least one backup bandwidth, e.g., an amount of bandwidth considered to be acceptable.

After obtaining an RSVP message that specifies more than one bandwidth, the network element determines in step 109 that less than the highest requested amount of bandwidth may be allocated. In other words, the network element determines that it has insufficient bandwidth to establish a reservation for the highest requested amount of bandwidth, e.g., "amount A." In the described embodiment, for purposes of discussion, while the network element may not be able to accommodate the highest requested amount of bandwidth, the network element may accommodate at least one of the amounts of bandwidth specified in the RSVP message.

In step 113, the network element allocates an amount of bandwidth, e.g., "amount B," in response to the RSVP message. That is, a reservation is established that reserves an amount of bandwidth that was effectively requested in the RSVP message and is less than the highest requested amount of bandwidth. Once the reservation is established, the network element typically stores information in step 117 relating to at least the requested amounts of bandwidth which were not accommodated. By way of example, state information which identifies the highest requested amount of bandwidth as being requested but not reserved may be stored by the network element. It should be appreciated that the network element may, in some instances, store information relating to all bandwidths that were specified in the RSVP message.

After storing information relating to requested amounts of bandwidth that were not allocated, the network element provides an indication to the sender of the RSVP message relating to the amount of bandwidth that was reserved or allocated in step 121. Such an indication may also be provided to other routers and a destination or receiver associated with the reservation.

From step 121, process flow moves to step 125 in which it is determined whether it is possible to allocate a higher amount of bandwidth with respect to the reservation. By way of example, as time elapses, the network element may determine whether it is able to accommodate a higher amount of bandwidth that was specified in the RSVP message. If the determination is that it is not possible to allocate a higher amount of bandwidth that was specified in the RSVP message, then in the described embodiment, the network element may once again make a determination as to whether it is possible to allocate a higher amount of bandwidth that was specified in the RSVP message.

Alternatively, if the determination in step 125 is that it is possible for the network element to allocate a higher amount of bandwidth specified in the reservation, then the network element provisionally reserves, e.g., sets aside or earmarks, additional bandwidth for the reservation in step 129. It should be appreciated that the additional bandwidth may be approximately a difference between the amount of bandwidth established for the reservation and a higher amount of bandwidth that was specified in the RSVP message.

Once additional bandwidth is provisionally reserved, the network element provides information in step 133 to at least the sender that the network element. That is, the network element essentially offers additional bandwidth with respect to the reservation. The information generally indicates that additional bandwidth may be allocated with respect to the reservation. In one embodiment, the information is provided in a message that identifies the reservation, the amount of bandwidth currently allocated to the reservation, the amount of additional bandwidth that is provisionally reserved, and higher bandwidths specified in the RSVP message which were not accommodated.

A determination is made in step 137 as to whether a new RSVP message is received or otherwise obtained from the sender that relates to the reservation. In one embodiment, an identifier for an already established, or existing, reservation may be included in RSVP messages associated with the already established reservation. Such a determination may be made after a predetermined amount of time has elapsed. If the determination is that a new RSVP message has not been received, then the provisional reservation for additional bandwidth is cleared in step 141, and the process of establishing a reservation and subsequently upspeeding the reservation is completed.

Alternatively, if it is determined in step 137 that a new RSVP message has been received from the sender with respect to the reservation, the indication is that the reservation is to be upspeeded. In other words, the implication is that the amount of bandwidth reserved in the reservation is to be increased. Accordingly, process flow moves to step 145 in which the existing reservation is upspeeded to include the additional bandwidth. The upspeeding of the existing reservation generally includes clearing the provisional reservation.

Upon upspeeding the existing reservation, a determination is made in step 149 as to whether the reservation, in its current state, accounts for, e.g., accommodates, the highest requested bandwidth specified in the original RSVP message. If the determination is that the reservation does not accommodate the highest requested bandwidth specified in the reservation, then the network element may attempt to upspeed the reservation at a later time. As such, process flow returns to step 117 in which information relating to requested amounts of bandwidth that have not been allocated with respect to the reservation may is stored. On the other hand, if the determination in step 149 is that the reservation accommodates the highest requested bandwidth specified in the original RSVP message, the process of establishing a reservation and subsequently upspeeding the reservation is completed.

Figure 2:
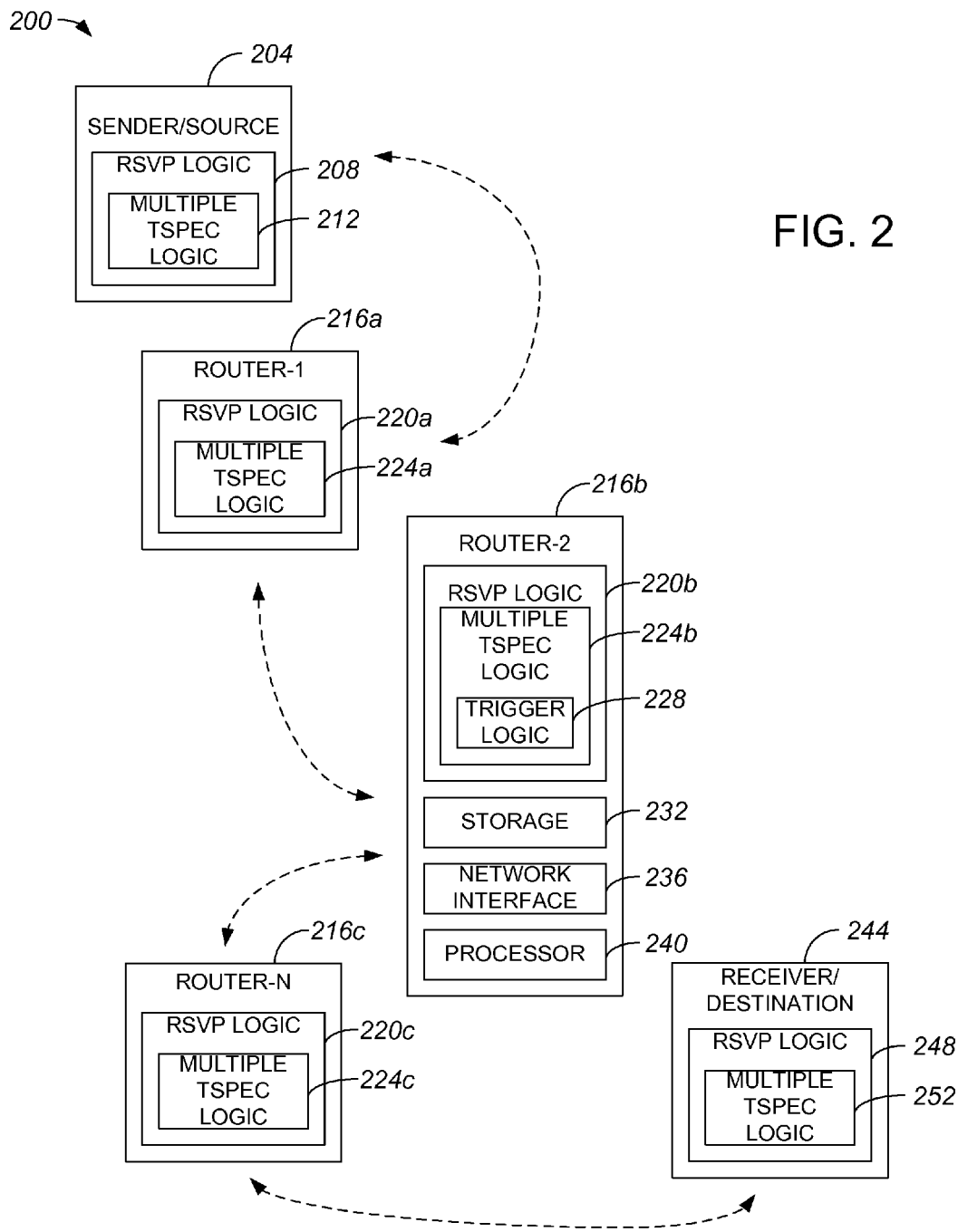
FIG. 2 is a block diagram representation of a system in which an intermediate router may trigger an upspeeding of an existing reservation in accordance with an embodiment.

As previously mentioned, a network element that determines that additional bandwidth is available for an existing reservation, and triggers an upspeeding process, may be an intermediate router within a path associated with the existing reservation. FIG. 2 is a block diagram representation of a network system in which an intermediate router may trigger an upspeeding of an existing reservation in accordance with an embodiment. A network system 200 includes a sender or a source 204, a plurality of routers 216*a-c*, and a destination or a receiver 244. Sender 204 is effectively a first endpoint in a path, and is arranged to send an RSVP message, e.g., an RSVP RESV request message, through routers 216*a-c* to receiver 244, which is effectively a second endpoint in the path. Plurality of routers 216*a-c* may generally include any number of routers.

Sender 204 is generally a server or a server application, and includes RSVP logic 208 that enables sender 204 to process RSVP messages, and to send RSVP messages to receiver 244 through routers 216*a-c*. RSVP logic 208 includes multiple TSPEC 212 logic that allows for the inclusion of multiple TSPECS in a message and, thus, the specification of multiple acceptable bandwidths in the message. In the described embodiment, multiple TSPEC logic 212 is configured to identify when an indication is obtained, e.g., from a router 212*a-c*, that indicates that an existing reservation may be upspeeded.

At least one router 216*a-c* includes functionality which enables multiple reservation states to be identified and stored. That is, one or more of routers 216*a-c* is configured to process an RESV request message that includes a plurality of TSPEC objects. As shown, router 216*a* includes RSVP logic 220*a* that includes multiple TSPEC logic 224*a*, and router 216*c* includes RSVP logic 220*c* that includes multiple TSPEC logic 224*c*. For purposes of illustration, router 216*b* will be described in more detail, although it should be appreciated that routers 216*a*, 216*c* may generally include the same components as router 216*b*.

Router 216*b* includes RSVP logic 220*b*, storage 232, a network interface 236, and a processor 240 that is configured to execute any portion of RSVP logic 220*b* that is software logic. Router 216*b* is arranged to obtain a RSVP RESV request message that includes more than one TSPEC object on network interface 236, which generally includes at least one input/output port. Once a message is obtained, multiple TSPEC logic 224 processes TSPECs associated with the message to determine which of the requested bandwidths associated with the TSPECs router 216*b* may support or otherwise accommodate. Using multiple TSPEC logic 224, router 216*b* may determine the highest bandwidth associated with the plurality of TSPEC objects that it may support. When router 216*b* is not able to support a highest requested bandwidth, or, a preferred bandwidth, multiple TSPEC logic 224*b* may be used to facilitate a reservation for an acceptable bandwidth, and to store reservation states in storage 232. Reservation states may indicate the bandwidth which has been reserved, as well as higher bandwidths that router 216*b* was unable to accommodate.

Trigger logic 228 is configured, in one embodiment, to determine when router 216*b* is able to upspeed an existing reservation, i.e., a reservation that is for less than a highest requested bandwidth. When trigger logic 228 identifies that router 216*b* has sufficient bandwidth to potentially increase the bandwidth allocation to an existing reservation, trigger logic 228 causes an indication to be sent to at least sender 204 which identifies at least the existing reservation, the amount of bandwidth associated with the existing reservation, the amount of additional bandwidth that router 216*b* may now provide to the existing reservation, and the requested bandwidths that router 216*b* could not previously accommodate. Sending such an indication effectively triggers an upspeeding process. It should be appreciated that in addition to sending the indication to sender 204, the indication may also be sent to routers 216*a*, 216*c* and to receiver 244.

Figure 3A:
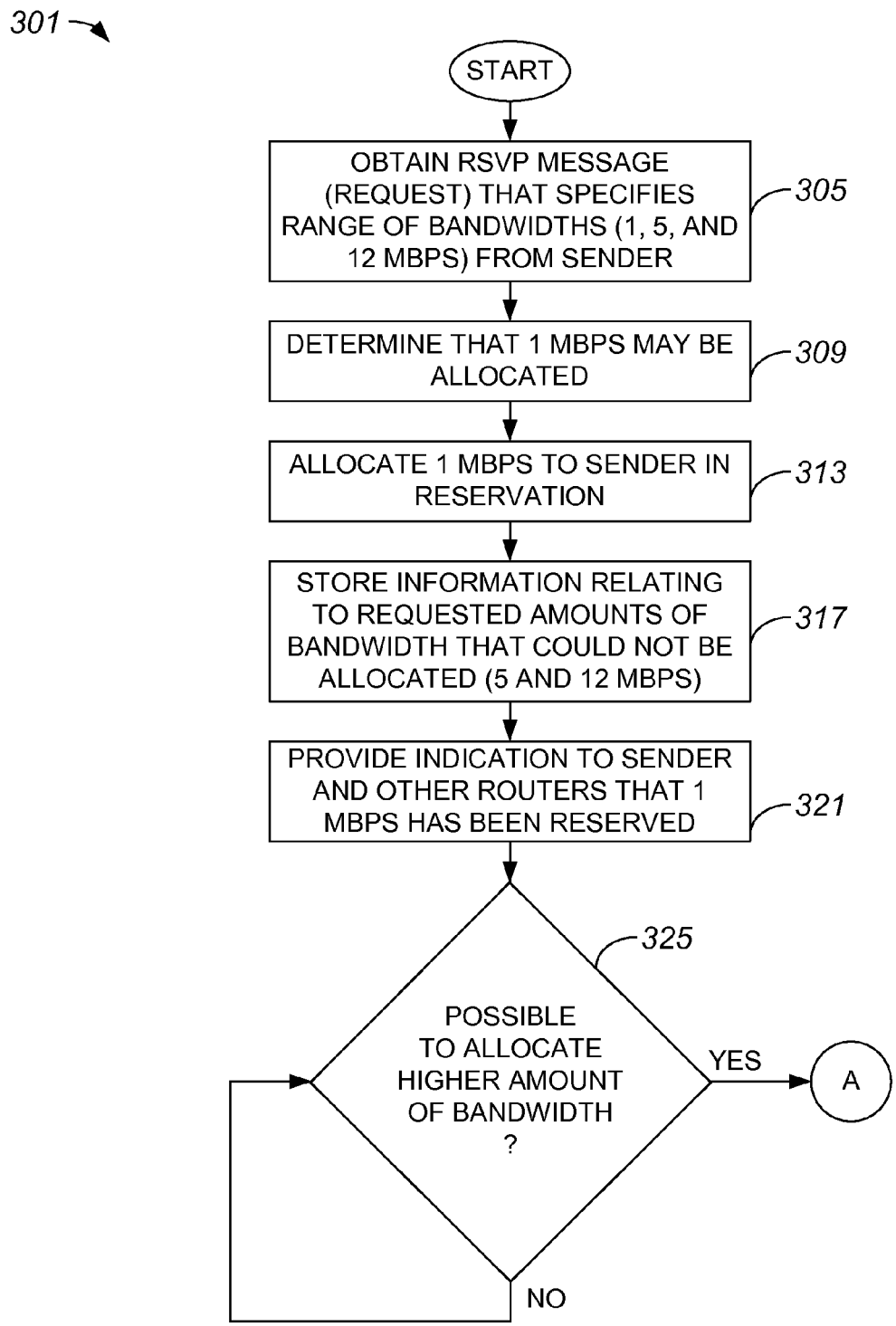
FIGS. 3A and 3B are a process flow diagram which illustrates an upspeeding process from the point of view of a network element, e.g., intermediate router-2 216b of FIG. 2, in accordance with an embodiment.
Figure 3B:
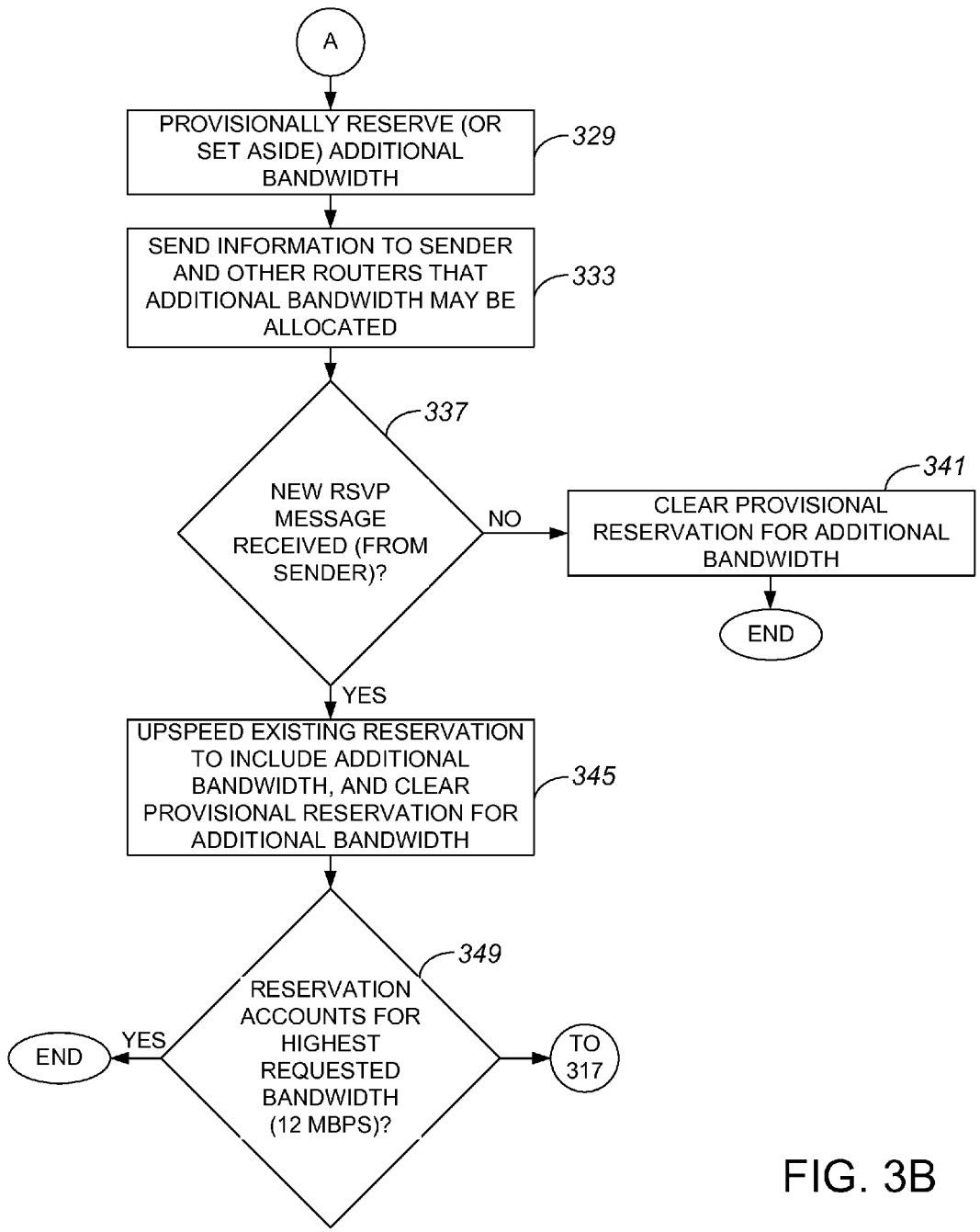

Sender 204 may send an RSVP RESV request message towards receiver 244, and the RSVP RESV request message may include a MULTI-TSPEC object which has multiple TSPEC objects specifying different acceptable bandwidths. By way of example, bandwidths of twelve mbps, five mbps, and one mbps may be specified or effectively requested, with the twelve mbps bandwidth being a highest requested bandwidth. With reference to FIGS. 3A and 3B, a process of creating and upspeeding a reservation with respect to a RSVP RESV request message that requests bandwidths of twelve mbps, five mbps, and one mbps in overall network 200 of FIG. 2 will be described in accordance with an embodiment for purposes of illustration. A process 301 of creating an upspeeding a reservation with respect to overall network 200 of FIG. 2 begins at step 305 in which an intermediate router, e.g., router 216*b* of FIG. 2, obtains a RSVP message that specifies a range of bandwidths. In the described embodiment, the bandwidths are one mbps, five mbps, and twelve mbps. The RSVP message is obtained from sender 204 of FIG. 2.

Upon obtaining the RSVP message, the intermediate router determines in step 309 how much bandwidth may be allocated in response to the RSVP message. In the given example, the intermediate router determines in step 309 that approximately the lowest specified bandwidth of one mbps may be allocated. As such, in step 313, approximately one mbps is allocated in the reservation. Then, in step 317, information relating to the requested amounts of bandwidth that the intermediate router was unable to allocate is stored, as for example in storage 232 of FIG. 2 as a reservation state. Once the information is stored, in step 321, an indication is provided to the sender, e.g., sender 203 of FIG. 2, to notify the sender that approximately one mbps has been reserved in response to the RSVP message obtained in step 305.

From step 321, process flow moves to step 325 in which it is determined whether it is possible to allocate a higher amount of bandwidth. In the given example, the determination in step 325 is whether intermediate router 216b of FIG. 2 may allocate either a total of approximately five mbps or a total of approximately twelve mbps with respect to the reservation.

If the determination in step 325 is that it is not possible to allocate a higher amount of bandwidth that was specified in the RSVP message, then in the described embodiment, the network element may once again make a determination as to whether it is possible to allocate a higher amount of bandwidth that was specified in the RSVP message. Alternatively, if the determination in step 325 is that it is possible for the network element to allocate a higher amount of bandwidth specified in the reservation, then the network element provisionally reserves, e.g., sets aside or earmarks, additional bandwidth for the reservation in step 329. With respect to the given example, additional bandwidth of either approximately four mbps or approximately eleven mbps may be obtained to increase the bandwidth allocated as a result of receiving the RSVP message to approximately five mbps or approximately twelve mbps, respectively.

After additional bandwidth is provisionally reserved, the intermediate router provides the information in step 333 to at least the sender, where the information indicates that the intermediate router is able to offer additional bandwidth for use with the reservation. It is determined, in step 337, when a new RSVP message is received by or otherwise obtained from the sender that relates to the reservation. If the determination is that a new RSVP message has not been received, then the provisional reservation for additional bandwidth is cleared in step 341. Clearing the provisional reservation effectively "returns" the additional bandwidth such that other applications may make use of the additional bandwidth. Once the provisional reservation is cleared, the process of creating and upspeeding a reservation is completed.

Alternatively, if it is determined in step 337 that a new RSVP message has been received from the sender with respect to the reservation, the indication is that the reservation is to be upspeeded. In other words, if a new RSVP message is obtained from the sender, then the implication is that the amount of bandwidth reserved in the reservation is to be increased. Therefore, process flow moves to step 345 in which the existing reservation is upspeeded to include the additional bandwidth. In the given example, the existing reservation is upspeeded to approximately five mbps. It should be appreciated that the upspeeding of the existing reservation generally includes clearing the provisional reservation.

Upon upspeeding the existing reservation to approximately five mbps, a determination is made in step 349 as to whether the reservation, in its current state, accounts for, e.g., accommodates, the highest requested bandwidth specified in the original RSVP message. In the given example, the highest requested bandwidth is approximately twelve mbps.

If the determination in step 349 is that the reservation does not accommodate the highest requested bandwidth specified in the reservation, then the network element may attempt to upspeed the reservation at a later time. In the given example, if the upspeeded reservation is for approximately five mbps and not approximately twelve mbps, then the highest requested bandwidth specified in the original RSVP message has not been accommodated. As such, process flow returns to step 317 in which information relating to a requested amount of bandwidth that has not been allocated, e.g., approximately twelve mbps, may be stored. Alternatively, if the determination in step 349 is that the reservation accommodates the highest requested bandwidth specified in the original RSVP message, e.g., approximately twelve mbps in the given example, the process of creating and upspeeding a reservation is completed.

As a part of a process of triggering the upspeeding of a suitable reservation, as for example a reservation which specified more than one example bandwidth or amount of a resource, a element that is responsible for substantially triggering the upspeeding of a suitable reservation may select from among a pool of reservations to determine which reservation to upspeed. Determining which reservation to upspeed also involves identifying a sender or source that the sender or source is associated with a reservation for which additional bandwidth has been allocated.

Figure 4:
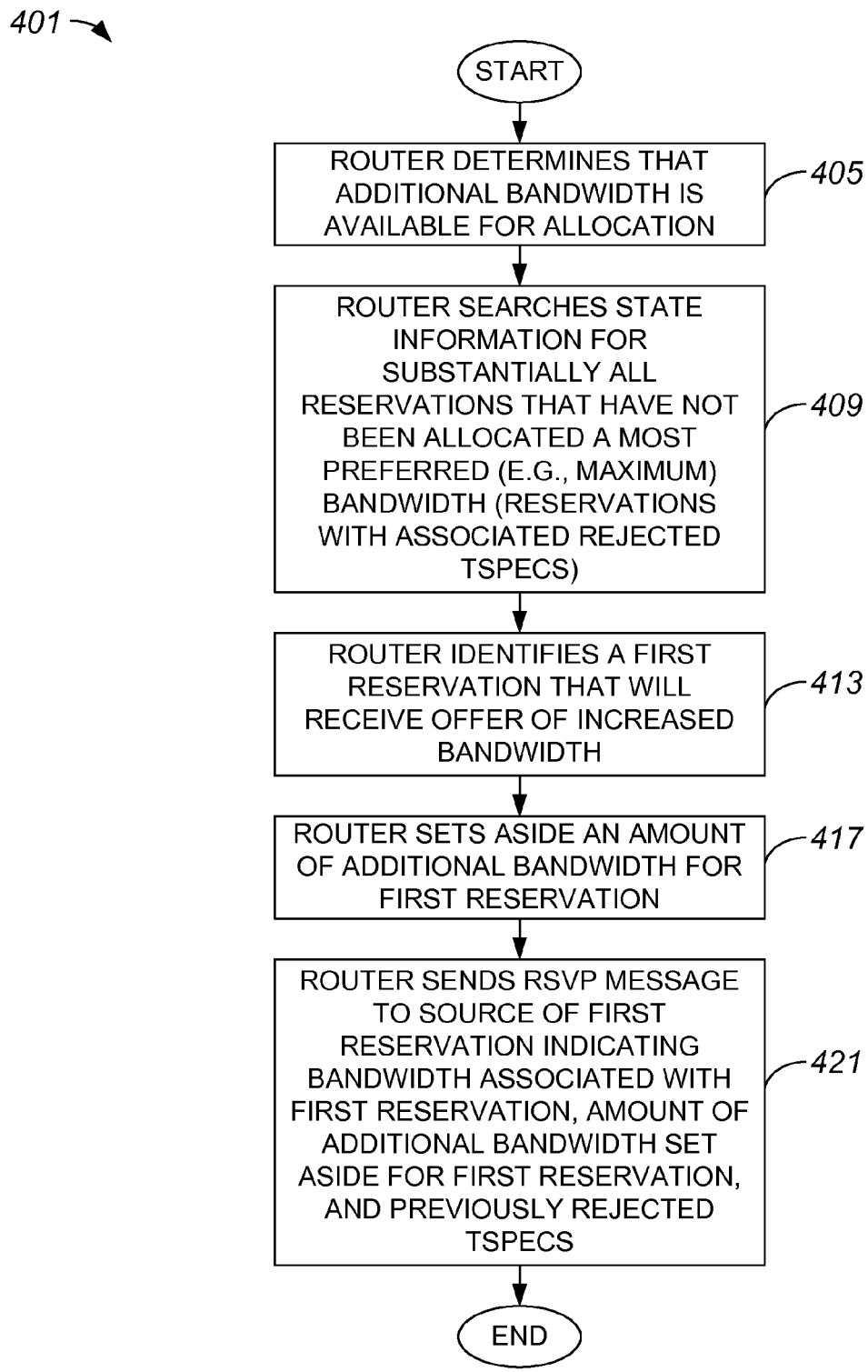
FIG. 4 is a process flow diagram which illustrates a method of notifying a source of additional available bandwidth in accordance with an embodiment.

FIG. 4 is a process flow diagram which illustrates a method of notifying a sender of additional available bandwidth in accordance with an embodiment. A method 401 of notifying a sender of additional available bandwidth begins at step 405 in which a network element determines that additional bandwidth is available for allocation. The network element may generally be a router that was able to establish a reservation for less than a highest requested bandwidth.

Once the router determines that additional bandwidth is available for allocation, the router searches in step 409 for state information relating to substantially all reservations with which the router is associated and for which less than a highest requested bandwidth has been reserved. That is, the router searches for reservations with associated rejected TSPECs. By way of example, an intermediate router may access its storage in an attempt to locate information relating to substantially all reservations that have not been allocated a most preferred amount of bandwidth.

In step 413, the router successfully identifies at least a first reservation that will effectively receive an offer of increased bandwidth. When more than one reservation has been established for less than a highest requested bandwidth, any suitable criteria may be used to identify which of the reservations will effectively receive an offer of increased bandwidth. Such criteria may include, but are not limited to including, the RSVP priority assigned to each reservation, the total amount of bandwidth that has been identified as available, user rank within a company or organization for a party requesting a reservation, the age of each reservation, and/or whether an RSPEC such as one for a guaranteed service instead of a controlled load is present with any reservation.

After the router identifies at least a first reservation that will essentially be offered an opportunity to upspeed, the router sets aside an appropriate amount of bandwidth for the first reservation in step 417. It should be appreciated that an appropriate amount of bandwidth will typically be set aside, or provisionally reserved, for each reservation that will essentially be offered an opportunity to upspeed.

Once an appropriate amount of bandwidth is set aside, process flow moves to step 421 in which the router sends an RSVP message to the sender or source of the first reservation. The message may include, but is not limited to including, an indication of the current bandwidth reserved for the first reservation, the amount of bandwidth set aside for the first reservation, and information relating to previously rejected TSPECs associated with the first reservation. The method of notifying a sender of additional available bandwidth is completed after the router sends an RSVP message to the sender.

Although only a few embodiments of the present invention have been described, it should be understood that the present invention may be embodied in many other specific forms without departing from the spirit or the scope of the present invention. By way of example, while multiple bandwidths have been described as being specified in a RESV message through the use of TSPECs or TSPEC objects, the bandwidths are not limited to being specified using TSPECs or TSPEC objects. For instance, multiple bandwidths may be specified in service-request specification (RSPEC) objects associated RESV messages.

In one embodiment, if none of the bandwidths specified in a RESV message may be supported, no bandwidth may be allocated in response to the RESV message. It should be appreciated, however, that some bandwidth may instead be allocated even if none of the specified bandwidths may be supported. For example, if a RESV message specifies a lowest preferred bandwidth, if the lowest preferred bandwidth may not be accommodated, rather than allocating substantially no bandwidth in response to the RESV message, an amount of bandwidth that is less than the lowest preferred bandwidth may be allocated in a reservation. In such an embodiment, an upspeeding of the reservation may be triggered when it becomes possible to support any of the bandwidths specified in the RESV message.

A trigger to upspeed may occur, in one embodiment, when a reservation is picked for upspeeding based on policy to at least the next highest TSPEC amount of bandwidth. That is, an upspeed may be triggered when sufficient bandwidth is available to reach a next highest amount of requested bandwidth when less than a highest amount of requested bandwidth was initially reserved. It should be understood, however, that policies may be specified with respect to when reservations are to be triggered for upspeeding, particularly when there are many substantially simultaneous reservations associated with a particular router interface. A router may determine, using a policy, a priority order in which reservations may be triggered for upspeeding.

The embodiments may be implemented as hardware and/or software logic embodied in a tangible medium that, when executed, is operable to perform the various methods and processes described above. That is, the logic may be embodied as physical arrangements, modules, elements, and/or components. Software logic may generally be executed by a central processing unit or a processor. A tangible medium may be substantially any suitable physical, computer-readable medium that is capable of storing logic which may be executed, e.g., by a computing system, to perform methods and functions associated with the embodiments. Such computer-readable media may include, but are not limited to including, physical storage and/or memory devices. Executable logic may include code devices, computer program code, and/or executable computer commands or instructions. Such executable logic may be executed using a processing arrangement that includes any number of processors.

It should be appreciated that a computer-readable medium, or a machine-readable medium, may include transitory embodiments and/or non-transitory embodiments, e.g., signals or signals embodied in carrier waves. That is, a computer-readable medium may be associated with non-transitory tangible media and transitory propagating signals.

The steps associated with the methods of the present invention may vary widely. Steps may be added, removed, altered, combined, and reordered without departing from the spirit of the scope of the present disclosure. By way of example, when a network element determines that additional bandwidth may be allocated with respect to an existing reservation, but the offer of additional bandwidth is effectively not accepted, the network element may issue additional offers of additional bandwidth with respect to the existing reservation any number of times. Therefore, the present examples are to be considered as illustrative and not restrictive, and the disclosure is not to be limited to the details given herein, but may be modified within the scope of the appended claims.

What is claimed is:

1. A method comprising:
reserving a first amount of bandwidth with respect to a path in response to a reservation request from a sender, wherein the reservation request specified a plurality of acceptable amounts of bandwidth including the first amount of bandwidth and a second amount of bandwidth, the first amount of bandwidth being less than the second amount of bandwidth;
determining, after reserving the first amount of bandwidth, that additional bandwidth is available, the additional bandwidth being sufficient to accommodate the second amount of bandwidth;
automatically providing a first indication that the additional bandwidth is available, wherein automatically providing the first indication that the additional bandwidth is available includes providing the first indication to at least the sender; and
obtaining a second indication, the second indication being arranged to indicate whether the second amount of bandwidth may be accommodated with respect to the path.

2. The method of claim 1 wherein the second amount of bandwidth is a highest desired bandwidth.

3. The method of claim 1 wherein the reservation request includes a plurality of bandwidth traffic specification (TSPEC) requests, the first amount of bandwidth being associated with a first TSPEC request, the second amount of bandwidth being associated with a second TSPEC request.

4. The method of claim 1 further including:
creating a provisional reservation for the additional bandwidth before automatically providing the first indication, wherein creating the provisional reservation for the additional bandwidth substantially prevents the additional bandwidth from being used while the provisional reservation is active.

5. The method of claim 4 further including:
determining when the second indication indicates that the second amount of bandwidth may be accommodated with respect to the path;
cancelling the provisional reservation after the second indication is obtained; and
reserving the additional bandwidth when it is determined that the second amount of bandwidth may be accommodated with respect to the path.

6. The method of claim 5 wherein the first amount of bandwidth is reserved in a reservation, and wherein reserving the additional bandwidth includes upspeeding the reservation.

7. The method of claim 1 wherein the first indication that the additional bandwidth is available further indicates that the additional bandwidth is available on a router and indicates that the second amount of bandwidth was previously requested in the reservation request, and wherein the router provides the first indication to at least the sender.

8. The method of claim 1 wherein the first indication is not provided as part of a resource reservation protocol (RSVP) refresh.

9. The method of claim 1 wherein reserving the first amount of bandwidth with respect to the path includes retaining a state associated with the second amount of bandwidth.

10. Logic encoded on one or more tangible non-transitory media for execution that, when executed by a computing device, is operable to:
reserve a first amount of bandwidth with respect to a path in response to a reservation request from a sender, wherein the reservation request specified a plurality of acceptable amounts of bandwidth including the first amount of bandwidth and a second amount of bandwidth, the first amount of bandwidth being less than the second amount of bandwidth;
determine, after reserving the first amount of bandwidth, that additional bandwidth is available, the additional bandwidth being sufficient to accommodate the second amount of bandwidth;
automatically provide a first indication that the additional bandwidth is available, wherein the logic operable to automatically provide the first indication that the additional bandwidth is available is further operable to provide the first indication to at least the sender; and
obtain a second indication, the second indication being arranged to indicate whether the second amount of bandwidth may be accommodated with respect to the path.

11. The logic of claim 10 wherein the second amount of bandwidth is a highest desired bandwidth.

12. The logic of claim 10 wherein the reservation request includes a plurality of bandwidth traffic specification (TSPEC) requests, the first amount of bandwidth being associated with a first TSPEC request, the second amount of bandwidth being associated with a second TSPEC request.

13. The logic of claim 10 further operable to:
create a provisional reservation for the additional bandwidth before automatically providing the first indication, wherein the logic operable to create the provisional reservation for the additional bandwidth substantially prevents the additional bandwidth from being used while the provisional reservation is active.

14. The logic of claim 13 further operable to:
determine when the second indication indicates that the second amount of bandwidth may be accommodated with respect to the path;
cancel the provisional reservation after the second indication is obtained; and
reserve the additional bandwidth when it is determined that the second amount of bandwidth may be accommodated with respect to the path.

15. The logic of claim 14 wherein the first amount of bandwidth is reserved in a reservation, and wherein the logic operable to reserve the additional bandwidth is further operable to upspeed the reservation.

16. The logic of claim 10 wherein the first indication that the additional bandwidth is available further indicates that the additional bandwidth is available on a router and indicates that the second amount of bandwidth was previously requested in the reservation request, and wherein the router provides the first indication to at least the sender.

17. The logic of claim 10 wherein the first indication is not provided as part of a resource reservation protocol (RSVP) refresh.

18. The logic of claim 10 wherein the logic operable to reserve the first amount of bandwidth with respect to the path is further operable to retain a state associated with the second amount of bandwidth.

19. An apparatus comprising:
means for reserving a first amount of bandwidth with respect to a path in response to a reservation request from a sender, wherein the reservation request specified a plurality of acceptable amounts of bandwidth including the first amount of bandwidth and a second amount of bandwidth, the first amount of bandwidth being less than the second amount of bandwidth;
means for determining, after reserving the first amount of bandwidth, that additional bandwidth is available, the additional bandwidth being sufficient to accommodate the second amount of bandwidth;
means for automatically providing a first indication that the additional bandwidth is available, wherein the means for automatically providing the first indication that the additional bandwidth is available further include means for providing the first indication to at least the sender; and
means for obtaining a second indication, the second indication being arranged to indicate whether the second amount of bandwidth may be accommodated with respect to the path.

20. An apparatus comprising:
a network interface, the network interface being configured to allow the apparatus to communicate on a network;
a resource, the resource having associated bandwidth;
logic operable to establish a reservation for a first amount of the bandwidth based on a reservation request obtained from a sender, wherein the reservation request is obtained through the network interface and specifies the first amount of the bandwidth and a second amount of the bandwidth, the second amount of the bandwidth being greater than the first amount of the bandwidth;
logic operable to determine when an amount of the bandwidth approximately equal to a difference between the first amount of the bandwidth and the second amount of the bandwidth is available;
logic operable to automatically indicate to the sender that the second amount of the bandwidth may be accommodated with respect to the resource; and
logic operable to determine when to accommodate the second amount of the bandwidth, after indicating to the sender that the second amount of the bandwidth may be accommodated with respect to the resource, wherein the logic operable to determine when to accommodate the second amount of the bandwidth is further operable to cause the second amount of the resource to be reserved.

21. The apparatus of claim 20 wherein the apparatus is a router.

22. The apparatus of claim 20 wherein the logic operable to cause the second amount of the resource to be reserved does not cause the second amount of the resource to be reserved as a part of a resource reservation protocol (RSVP) refresh.

23. The apparatus of claim 20 wherein the logic operable to automatically indicate to the sender that the second amount of the bandwidth may be accommodated is operable to send a message to the sender, the message including information identifying the first amount of the bandwidth and the second amount of the bandwidth.

24. The apparatus of claim 20 wherein the logic operable to cause the second amount of the resource to be reserved is configured to upspeed the reservation.

\* \* \* \* \*